O. HESSER.
MACHINE FOR AUTOMATICALLY MAKING PAPER PACKETS.
APPLICATION FILED MAY 6, 1909.

1,020,821.

Patented Mar. 19, 1912.

Witnesses
Mary W. Hammer
Albert Popkins

Inventor
Otto Hesser
By Sturtevant & Mason
Attorneys

O. HESSER.
MACHINE FOR AUTOMATICALLY MAKING PAPER PACKETS.
APPLICATION FILED MAY 6, 1909.

1,020,821.

Patented Mar. 19, 1912.

O. HESSER.
MACHINE FOR AUTOMATICALLY MAKING PAPER PACKETS.
APPLICATION FILED MAY 6, 1909.

1,020,821.

Patented Mar. 19, 1912.

O. HESSER.
MACHINE FOR AUTOMATICALLY MAKING PAPER PACKETS.
APPLICATION FILED MAY 6, 1909.

1,020,821.

Patented Mar. 19, 1912.
6 SHEETS—SHEET 6.

UNITED STATES PATENT OFFICE.

OTTO HESSER, OF STUTTGART-CANNSTATT, GERMANY.

MACHINE FOR AUTOMATICALLY MAKING PAPER PACKETS.

1,020,821.  Specification of Letters Patent.  Patented Mar. 19, 1912.

Application filed May 6, 1909. Serial No. 494,395.

*To all whom it may concern:*

Be it known that I, OTTO HESSER, a citizen of the German Empire, residing at Stuttgart-Cannstatt, in the Kingdom of Wurttemberg, Empire of Germany, have invented certain new and useful Improvements in Machines for Automatically Making Paper Packets; and I do hereby declare the following to be a full, clear, and exact description of the invention, such as will enable others skilled in the art to which it appertains to make and use the same.

This invention relates to a machine by means of which paper packets with one end open may be automatically made, and in this machine in particular so-called double packets are made, that is to say packets which consist of two packets inserted one in another. In the improved machine two flat sheets lying in separate piles are formed quite automatically into the finished packet.

In this machine one sheet is first folded at the different stations over a folding mandrel of suitable form into packet form, and then over this packet, while still on the folding mandrel, a second sheet is folded in the same manner, whereupon when the whole packet is finished it is automatically removed from the mandrel and delivered from the machine.

Preferably a thick paper, such as cardboard or the like, is employed for the inner packet, which must necessarily be somewhat creased at the bends.

One form of construction of the invention will now be more particularly described as an example, with reference to the accompanying drawings, in which:—

Figure 1 is a plan view of the whole machine;
Figs. 9, 10 and 11 explain progressively in section the formation of the tube;
Fig. 15 is an end view;
and Fig. 16, a side view of the device for pressing the longitudinal fold;
Fig. 20 is a diagrammatic plan view of the arrangement of the different stations and the devices provided at them; while.

The entire machine is operated from a single driving gear 1 which is mounted in the machine frame 2 with a table 3 and operates the separate mechanism of the improved machine by means of shafts 4, 5 and 6.

Figure 20:
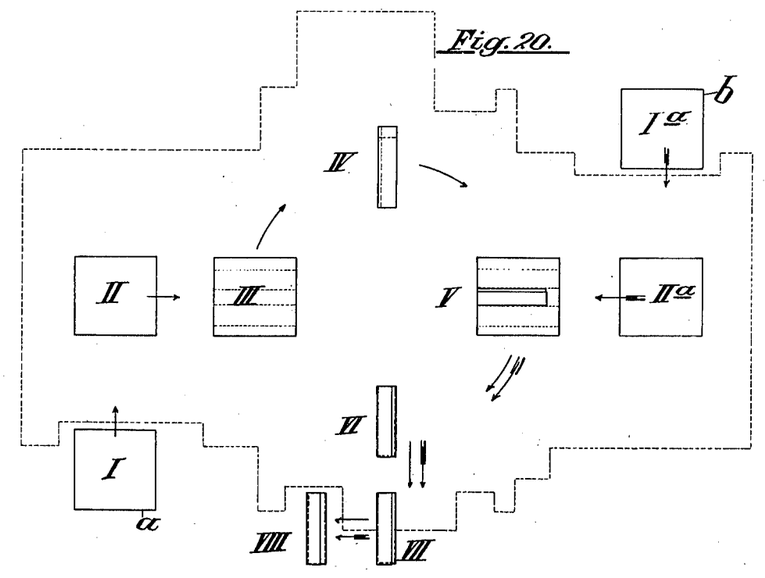
Figure 21:
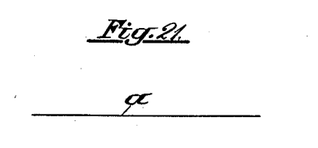
Figs. 21-24 show the forming of the first paper sheet into the inner packet, and in similar manner.

The sheets $a$ and $b$ are piled independently at the stations I and I$^a$ (Figs. 1 and 20), sheet $a$ being formed into an inner packet, while sheet $b$ in exactly similar manner is formed into the outer packet. Consequently only one of the operations will be described and the corresponding parts of the devices for the other sheet, are provided with an index numeral.

Figure 1:
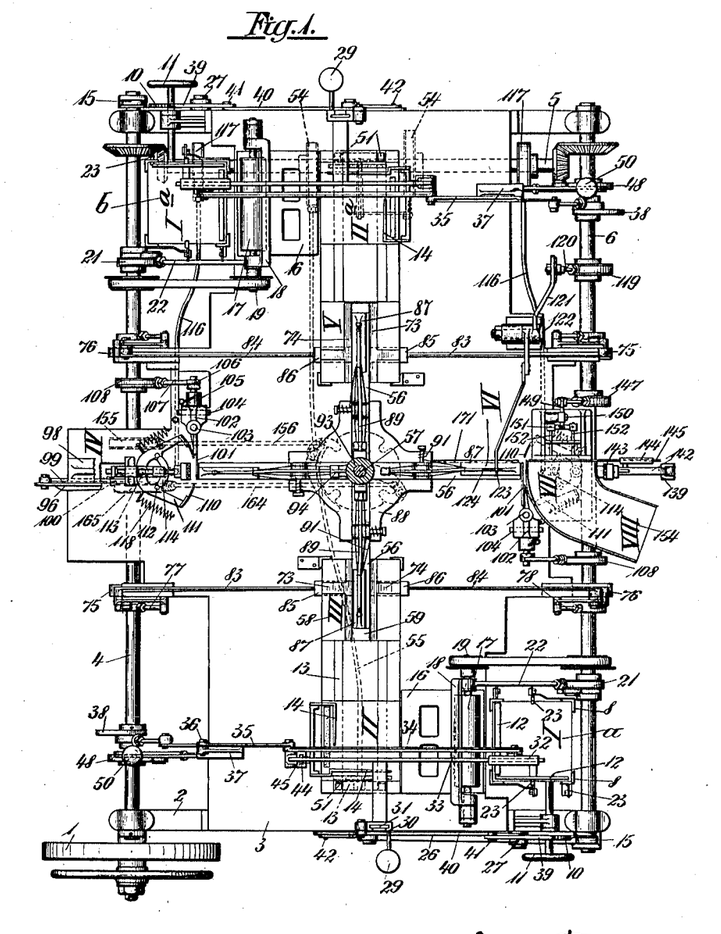
Figure 7:
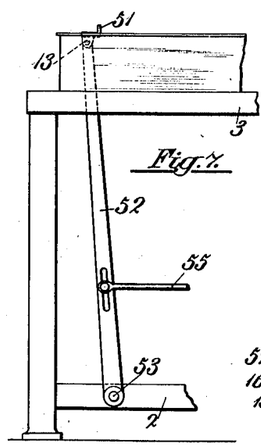
Fig. 7 is a side view of the paper carriage.

The sheets $a$ lie in a pile $g$, which is automatically adjusted as the sheets are used by a shifting mechanism hereinafter described. Pasting members 12 are also provided for applying the paste and for conveying the sheets $a$, the arrangement and form of which members correspond to the object for which the sheets are to be used and in the construction shown the members are arranged at right angles to one another (Fig. 1). These pasting members 12 execute a double movement—a vertical and a horizontal one. In the vertical movement the pasting member is pressed down on the topmost sheet $a$ of the pile $g$, and the sheet $a$ on the return of the pasting member 12 is lifted off the pile $g$ and then conveyed by the horizontal movement to a conveyer carriage 13 at the II station (Figs. 1 and 7), on which carriage the paper sheet is retained by wipers or strippers 14 when the pasting member 12 is again moved to the pile $g$.

Figure 2:
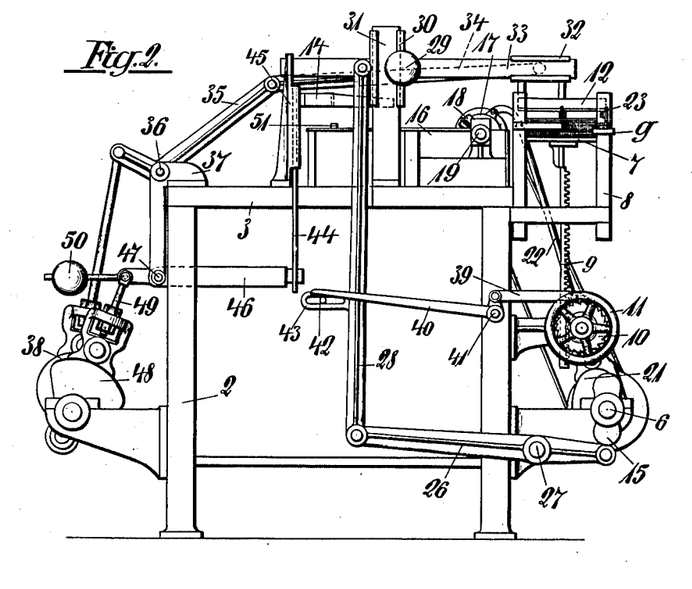
Fig. 2, a side view of the sheet-feeding device.

The pasting member 12 is carried by a carriage 32, which is displaceable along a horizontal bar 33. This bar 33 is in turn carried by a carriage 30, which travels on a vertical bar 31 (Figs. 1 and 2).

The vertical movement and the lifting of the pasting member 12, is effected by means of a cam 15, mounted on the shaft 6. This cam transmits its movement by means of a two-armed lever 26, pivoted on a pin 27 on the frame 2, and a link bar 28, to the carriage 30, the return movement being effected, for instance, by a weight 29 or the like. The horizontal movement of the pasting member 12 and the carriage 32 along the bar 33 is effected by means of a cam 38 mounted on the shaft 4, the carriage 32 being reciprocated by means of a bell crank lever 35 and link bar 34.

The paste is supplied to the pasting member 12 by means of a pasting apparatus 16, through the intermediary of a continuously rotating pasting roller 17, driven from the shaft 6 by means of a belt or the like. The pasting member 12 in its course to the pile g rubs directly over the pasting roller 17 and is thereby provided with paste. In its subsequent return movement to the paper carriage 13, the pasting member 12 carries with it the uppermost paper sheet a adhering to it, and thus carries it above the pasting roller 17. In order, however, to prevent any contact of the depending sheet a with the pasting roller, the latter is covered at a given moment. For this object a special covering bar or shield 18 is provided, which rocks on the axis 19 of the pasting roller 17. A cam 21 is provided on the shaft 6 for operating this bar 18, which cam rocks the bar 18 to and fro by means of an eccentric rod 22 and lever arm 20.

Figure 3:
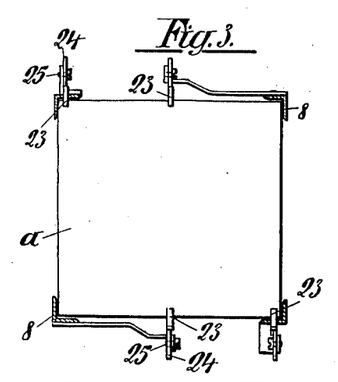
Figs. 3, 4 and 5 are views of the pile of sheets, with a device for preventing several sheets being lifted at the same time.
Figure 4:
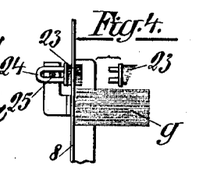
Figure 5:
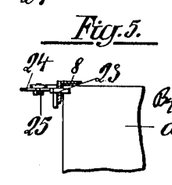
Figure 6:
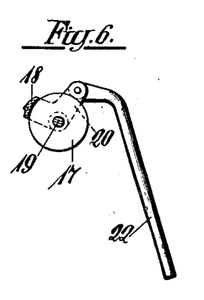
Fig. 6 is an end view and partial section of the means for temporarily covering the pasting roller.

In order to prevent more than one sheet a being removed from the pile g at the same time, spring tongues 23 or the like are provided (Figs. 3-5), which are preferably cut obliquely, the lowermost tongues 23 if necessary engaging only slightly over the sheet, while the upper ones engage farther, so that the surplus sheets are detained. These tongues 23 are pivotally mounted, in order to allow of their being more conveniently adjusted, their holders 24 being revolubly arranged on a set screw 25, on the release of which the adjustment may be effected as is required by the actual condition of the sheets.

In order to enable the pile g, which rests on a plate 7 and between guides 8, to be adjusted vertically as the sheets are used up, a ratchet device is provided. This consists of a toothed wheel, gearing with a rackbar 9, which carries the pile g and the plate 7. On the shaft of this toothed wheel, a ratchet disk 10 is fixed with which a pawl 39 engages, which is periodically moved forward by means of a bell crank lever 40 pivoted at 41. This bell crank lever 40 is controlled by a pin 42, which is displaceably mounted in the slot of a projection 43 of the link bar 28. When the link bar moves the lever 40 is more or less turned and thereby the ratchet wheel 10 moved forward. In order to be able to move the pile g up and down independently of the shifting device, a hand wheel 11 or the like, is mounted on the shaft of the ratchet wheel 10.

When the paper sheet a is brought by the pasting member 12 above the carriage 13 at the II station, it is retained on the carriage 13 by wipers or strippers 14, while the pasting member 12 returns (Fig. 2). These wipers 14 are mounted on a common bar 44, which slides vertically in a guide 45, and is moved up and down by means of a cam 48 on the shaft 4 by means of a push bar 49 and a lever 46 pivoted on a pin 47.

Catches 51 are provided on the carriage 13, which engage behind the sheet a and convey it to the III station. The carriage 13 itself is also carried in bars and is moved forward by an arm 52 pivoted at 53 (Fig. 7) and is moved to and fro by a cam 54 from the shaft 5 by means of a rod 55.

Figure 8:
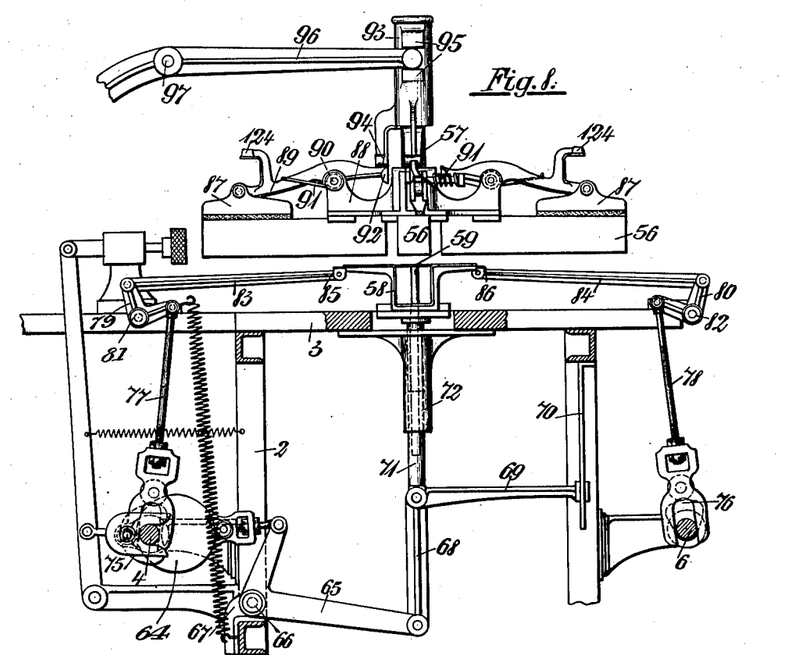
Fig. 8, a side view of the device for forming the packet tube.
Figure 12:
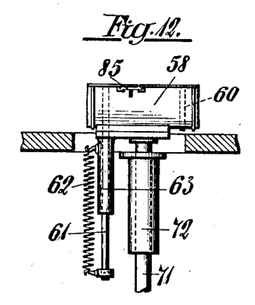
Fig. 12 shows the arrangement of the longitudinal folders.

The forming of the flat sheet of paper a into the finished packet is done as usual by means of a mandrel 56, which is fixed on a periodically rotating vertical shaft 57 (Fig. 8). This mandrel 56 works in conjunction with a folding box 58 which can rise and fall and the inside form of which corresponds to the form of the mandrel. After the sheet has reached the III station it rests on the folding box 58 which is closed by a plate 59 which can be pressed inward. For this purpose the plate 59 is guided at one end by a pin 60 (Fig. 12) and at the other end is attached to a bar 61 which is under the action of a spring 62, which tends to press it upward. On a mandrel 56 entering the box the plate 59 is then pressed inward, while the bar 61 slides in a socket or sleeve 63.

Figures 9, 11:
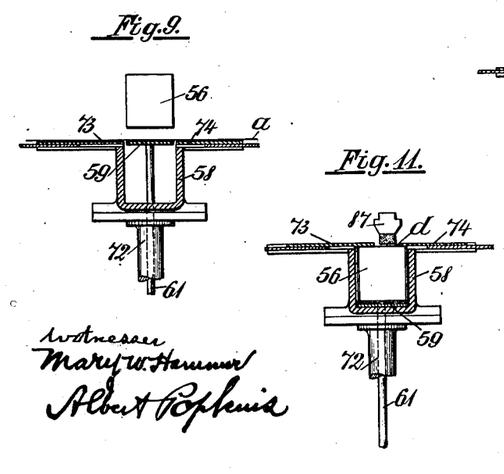
Figure 10:
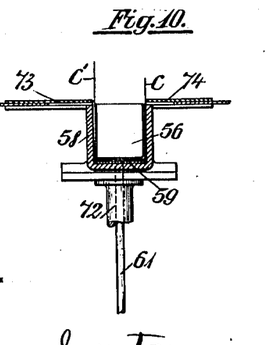
Figure 23:
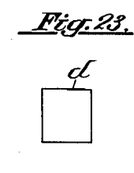

When the sheet a has reached the folding box 58 (Figs. 9-11), it is raised until the mandrel 56 lying above it has entirely entered the folding box 58 (Fig. 10). By this means the sheet a is folded around the mandrel 56 corresponding to the original position of the sheet in such a way that one of the projecting ends c of the sheet a is longer than the other projecting end, so that in the subsequent folding over, the longitudinal seam d lies at the side as is usually the case in such packets (Fig. 23). This lifting of the folding box 58 is effected by the driving shaft 4 for instance by means of a double eccentric 64 mounted thereon, which raises and lowers the folding box 58 by means of a bell crank lever 65 pivoted at 66 and a link 68, guide 69, 70 and a bar 71 guided in a sleeve 72.

For folding the projecting ends c of the sheet over the mandrel 56, so-called longitudinal folders 73 and 74 (Fig. 1) are employed which are mounted on the folding box 58 in such a way as to be directly displaceable and preferably on the table-top like upper side of said box. These folders 73 and 74 are reciprocated by the shafts 4 and 6, which may be done, for instance, by means of cams 75 and 76, which reciprocate the longitudinal folders 73 and 74 in the desired manner by means of eccentric rods 77 and 78, bell crank levers 79 and 80, pivoted on pins 81 and 82 and links 83 and 84. These folders are formed as slides and may for this object be provided with guide bars 85 and 86.

Figure 22:
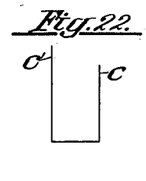

In the packet b shown in Figs. 10 and 22, the folder 74 first moves forward, when the folding box 58 has reached its highest position, and bends down one end c, and the folder 73 is then pushed forward, and folds over the other end C' which then overlaps the end, after which the previously raised ordinary pressing die 87 descends in the well known manner and firmly presses the seam d which has been previously provided with paste, whereupon the slides 73 and 74 again move back. When the folding box 58 is lifted, the longitudinal folders 73 and 74 must not be displaced but must remain in their original position of readiness. For this object the cams 75 and 76 are of such a shape that the folders 73 and 74 are pushed forward to a certain extent corresponding to the rise of the folding box 58, but in reality remain stationary in their place until the bell crank levers 79 and 80 have suitably turned. The same applies also when the folding box descends.

Figure 19:
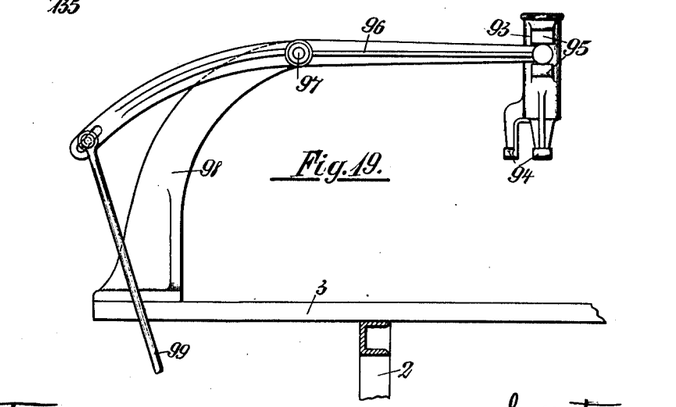
Fig. 19 is a side view of the mechanism for raising and lowering the pressing device.

In order to press the dies or stamps 87 down on the longitudinal fold d, they are pivotally carried by arms 89, which in turn pivot on pins 90 and are pressed downward by springs 91. Each pin 90 is mounted on a disk 88 which also carries the mandrel 56 and is fixed on the shaft 57. A sleeve 93 is also provided on this shaft 57 for lowering the pressing stamp 87, which sleeve is provided with pressing arms 94 (Figs. 8 and 19). Now if at a given moment this sliding sleeve 93 be lowered, the arms 94 encounter the rear ends 92 of the levers 89 and the stamp 87 is thereby lifted off the seam d. This lowering is effected from the shaft 4 by means of a cam 100, which causes a lever 96 to rock by means of a push rod 99, said lever being pivoted at 97 on an arm 98. The lever engages with its free forked end, which is formed as a roller, between projections 95 of a slide piece 93, so that the latter, when the lever 96 is moved, is pushed up and down.

Figure 13:
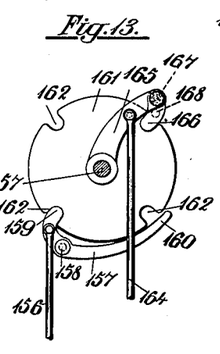
Fig. 13 is a plan view of the device for moving forward the mandrel.

When the sheet a is folded into a tube the shaft 57 is periodically turned through 90°, whereby each mandrel comes to the next station, that is to say the tube just formed reaches station V. This moving forward of the shaft 57 is effected by means of a separate shifting device (Fig. 13). This consists of a disk 161, which is mounted on the shaft 57 and has recesses 162 which serve for moving forward and stopping the disk 161. An arm 165 which is loosely revoluble on the shaft 57 is provided for moving the disk forward, which arm has a pawl 166 which is adapted to engage in the recess 162. This pawl 166 is under the action of a spring 167 and has on its under side a pin 168. A pawl 159 is also provided for locking the disk 161 in the position to which it has been moved, which pawl forms one end of a two-armed lever 157 pivoted at 158. Now when the disk is to be moved farther forward, the pawl 159 is first withdrawn from its recess 162 by means of a cam 155 mounted on the shaft 4, by the intermediary of a push rod 156, and thereby the disk 161 is released. The free arm 160 of the lever 157 is thereby simultaneously caused to pass inwardly under the disk 161. The pawl 166 is then operated by means of the eccentric 165 mounted on the shaft 4, and the push rod 164, so that thereby the disk 161 is turned through 90°. The pin 168 of the pawl 166 thus comes behind the arm 160. Now if the pawl 159 be brought into engagement with the next recess or slot 162, in order to lock the disk 161, the arm 160 presses the pawl 166 outward by means of the pin 168, and it can move back, whereupon the operation recommences or is repeated.

Figure 14:
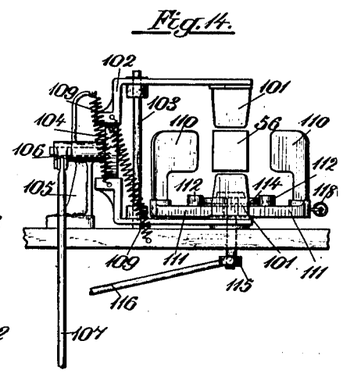
Fig. 14, an end view of the bottom folders.
Figures 17, 18:
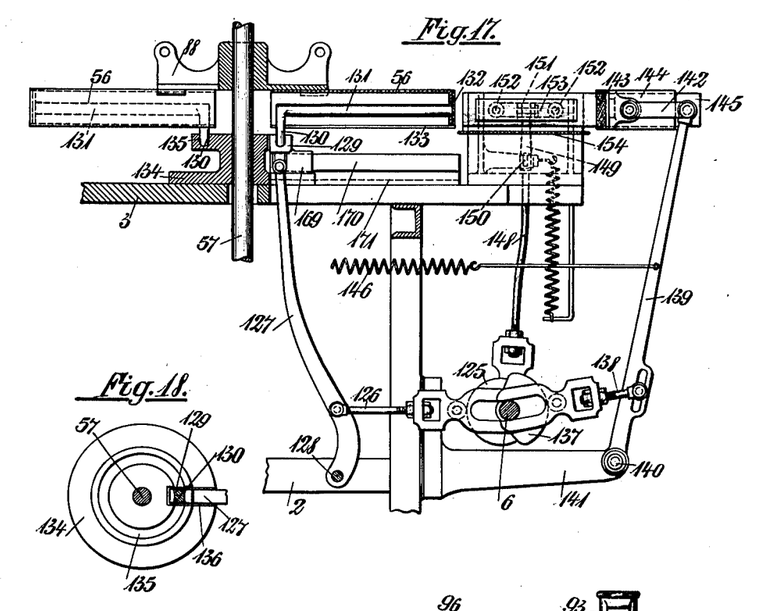
Fig. 17 is a side view of the devices for ejecting the finished packet.
Fig. 18 is a sectional plan view of the operating shaft.
Figure 24:
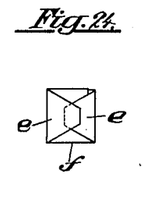
Figure 25:
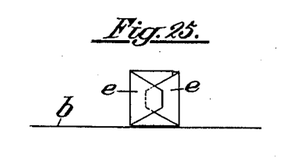
—Figs. 25-28 show the formation of the second packet.
Figure 26:
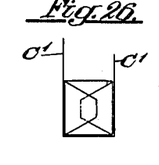
Figure 27:
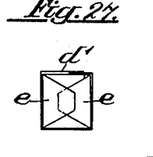
Figure 28:
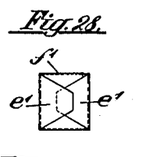

At station IV the inner packet is finished, that is to say the bottom f is closed (Figs. 1, 24 and 14). The closing of the bottom is effected by means of so-called bottom folders, which work in pairs crosswise. First the upper and lower bottom folders 101 operate, said folders are carried by arms 102 and mounted on a vertical bar 103, and are constantly drawn by springs 109 against a cam 104, so that they move vertically in an opposite direction on the rotation of the cam 104. In order to operate the cam 104 revolubly mounted in a bearing 105, it is provided with a lever arm 106 and is controlled by a cam 108 mounted on the shaft 4, by the intermediary of a push rod 107. The two lateral folders which turn over the flaps e formed by the first folders are moved in a similar manner. This is done by means of a cam 114 against which the folders 110 mounted on arms 111 bear by means of guide rollers 112. The arms 111 are here drawn by springs 118 against the cam 114, so that on the rotation of the latter they approach one another or move apart respectively. The cam 114 is operated from the shaft 5 by means of a cam 117 which operates it by means of a rod 116 and a lever mounted on the shaft 115 of the cam 114. After the bottom f is formed it is pressed down firmly by a pressing stamp. This is shown in side elevation in Fig. 8. The pressing stamp 143 of station VI is shown in Fig. 17. The inner packet is thus finished (Fig. 25), and then the second sheet *b* is wrapped around this packet in exactly the same manner. For this object the shaft 57 is again moved forward through 90°, so that the packet reaches stopping place V, where the sheet *b* is placed as a tube around the packet (Figs. 26 and 27). The packets then reach stopping place VI, by the moving forward of the shaft 57, where the outer sheet is completely folded into a packet, that is to say the sheet is closed in the same way as hereinbefore described.

Figures 15, 16:
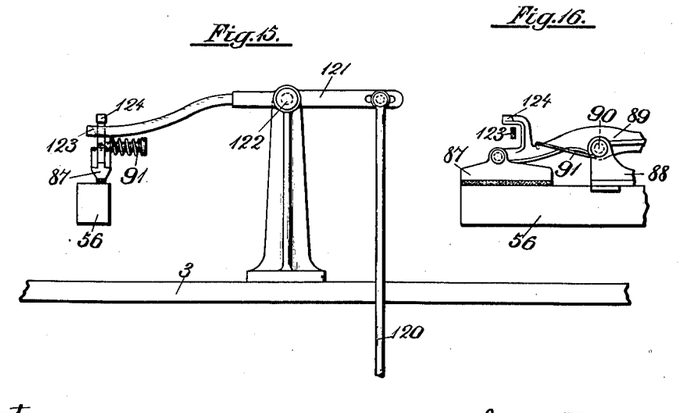

Now in order to have the longitudinal seam or fold *d* thoroughly pressed, a separate arrangement is provided at station VI, in order to again press the longitudinal fold *d* (Figs. 15 and 16). For this object an arm 123 is provided, which is adapted to press against an arm 124 of the pressing die 87, and the lever 89. This arm 123 is operated from the shaft 6 by means of a cam 119, the rod 120 of which acts on the rear end 121 of the arm 123, which turns on a pivot 122, which end is formed as a lever. This pressing of the longitudinal seam *d* is done by the dies during the whole turning. At the station VI the final pressing is very strong, and will be taken up by a special cam 119. The arm 123 first presses the die 87 down, and then raises it by lifting the arm 124, so that the bag may be removed from the mandrel. The finished packet is now removed from the mandrel 56 (Fig. 17). For this object an ejector 132 is provided, the rod 131 of which is provided with a bend (130), which moves in a circular channel 135 of a plate 134 fixed on the table 3, when the mandrel 56 turns. Having reached station VI, this bend 130 then passes into the claw-shaped head 129 of a lever 127 which pivots on a pin 128 of the machine frame 2 and is moved to and fro from the shaft 6 by means of an eccentric 125, and rod 126. The lever 127 has at its upper end a slide piece 169, which travels in a slide bar 170, mounted on the table-top 3 by means of an angle piece 171, whereby the lever 127 is securely guided. In its outward movement therefore it encounters the bottom *f* of the finished packet and thereby draws it away from the mandrel 56. In this operation of drawing off the packet, a pressing stamp 143 bears from the outside against the bottom *f*, so that this is retained between the ejector 132 and the pressing stamp 143. The stamp 143 is also mounted on a slide 144 which slides on a horizontal bar 145 and is operated from the shaft 6 by means of the cam 137. This causes a lever 139 which is acted on by a spring 146, to rock by means of the push rod 138, which lever turns on a pin 140 carried by an arm 141 of the machine frame 2. The packet thereby comes to station VII (Figs. 1 and 17). This consists of a somewhat inclined trough 154 into which it is thrown by a plate 153 operated by a cam 147, mounted on the shaft 6, by the intermediary of the rod 148 and lever 149. This turns on a pin 150 and thereby pushes the bar 152 mounted on a crosspiece 151, which carries the plate 153 forward, so that the packet now comes into the trough 154 and slides automatically down the same, until it drops into a receptacle, that is to say reaches station VIII, whereby the work of the machine is finished.

Instead of making the packets of double sheets, they may of course be equally well made with a single wrapper, and on the same machine, the start being then made from station I$^a$.

It will be seen from Fig. 1, that the parts of the stations I I$^a$, II, II$^a$, III and V are duplicated, and the folding parts of stations IV and VI.

I declare that what I claim is:—

1. In a machine for automatically making packets open at one end, rotating folding mandrels, means for feeding sheets of paper lying in separate piles from two sides simultaneously to said folding mandrels, said means for feeding the sheets of paper separately, comprising a pasting apparatus having a pasting member with means for operating it to engage a sheet, and a carriage for conveying the sheets to the mandrels, folding devices which first fold from the first sheet the inner packet on one of the mandrels, then fold over this packet the second sheet for the outer packet, and an ejector for ejecting the finished packet from the mandrel.

2. In a machine for automatically making packets open at one end, rotating folding mandrels, means for feeding sheets of paper lying in separate piles from two sides simultaneously to said folding mandrels, said means for feeding the sheets of paper separately, comprising a pasting apparatus having a pasting member with means for operating it to engage a sheet, a carriage for conveying the sheets to the mandrels, folding devices which first fold from the first sheet the inner packet on one of the mandrels, then fold over this packet the second sheet for the outer packet, an ejector for ejecting the finished packet from the mandrel, said pasting member being arranged between the pile of sheets and the carriage, and a pasting roller over which the pasting member passes on its return to the sheet pile, and means for covering said roller during the outward passage of said member.

3. In a machine for automatically making packets open at one end, rotating folding mandrels, means for feeding sheets of paper lying in separate piles from two sides simultaneously to said folding mandrels, said means for feeding the sheets of paper separately, comprising a pasting apparatus having a pasting member with means for operating it to engage a sheet, a carriage for conveying the sheets to the mandrels, folding devices which first fold from the first sheet the inner packet on one of the mandrels, then fold over this packet the second sheet for the outer packet, an ejector for ejecting the finished packet from the mandrel, said pasting member being arranged between the pile of sheets and the carriage, and a pasting roller over which the pasting member passes on its return to the sheet pile, and a bar arranged on an axis parallel to the pasting roller, and means for rocking said bar to cover the pasting roller during the outward passage of the pasting member.

4. In a machine for automatically making packets open at one end, rotating folding mandrels, means for feeding sheets of paper lying in separate piles from two sides simultaneously to said folding mandrels, said means for feeding the sheets of paper separately, comprising a pasting apparatus having a pasting member with means for operating it to engage a sheet, a carriage for conveying the sheets to the mandrels, folding devices which first fold from the first sheet the inner packet on one of the mandrels, then fold over this packet the second sheet for the outer packet, an ejector for ejecting the finished packet from the mandrel, and a rising folding box, the folding devices being directly mounted thereon.

5. In a machine for automatically making packets open at one end, rotating folding mandrels, means for feeding sheets of paper lying in separate piles from two sides simultaneously to said folding mandrels, said means for feeding the sheets of paper separately, comprising a pasting apparatus having a pasting member with means for operating it to engage a sheet, a carriage for conveying the sheets to the mandrels, folding devices which first fold from the first sheet the inner packet on one of the mandrels, then fold over this packet the second sheet for the outer packet, an ejector for ejecting the finished packet from the mandrel, a rising folding box, the folding devices being directly mounted thereon, and means for causing the action of the folding devices only when the box is completely raised.

6. In a machine for automatically making packets open at one end, rotating folding mandrels, means for feeding sheets of paper lying in separate piles from two sides simultaneously to said folding mandrels, said means for feeding the sheets of paper separately comprising a pasting apparatus having a pasting member with means for operating it to engage a sheet, and a carriage for conveying the sheets to the mandrels, folding devices which first fold from the first sheet the inner packet on one of the mandrels, and then fold on this packet the second sheet for the outer packet, means for pressing down the longitudinal seam when the packet is finished, comprising a pressing stamp and an arm for operating the same, the movement of the arm being so timed that it presses the stamp firmly against the longitudinal seam before the fixed packet is drawn off, and afterward leaves it, and an ejector for ejecting the finished packet from the mandrel.

7. In a machine for automatically making packets open at one end, rotating folding mandrels, means for feeding sheets of paper lying in separate piles from two sides simultaneously to said folding mandrels, said means for feeding the sheets of paper separately comprising a pasting apparatus having a pasting member with means for operating it to engage a sheet, and a carriage for conveying the sheets to the mandrels, folding devices which first fold from the first sheet the inner packet on one of the mandrels, and then fold on this packet the second sheet for the outer packet, and an ejector for removing the finished packet from the mandrel guided in the front end of the mandrel, and a member for operating the ejector, the rear end of the ejector projecting through a longitudinal slot in the mandrel and engaging the operating member.

In testimony whereof I affix my signature, in presence of two witnesses.

OTTO HESSER.

Witnesses:
 JEAN GULDEN,
 HERMANN HOPPE.